US012144412B2

(12) United States Patent
Kumai et al.

(10) Patent No.: US 12,144,412 B2
(45) Date of Patent: Nov. 19, 2024

(54) APPLICATOR

(71) Applicant: MITSUBISHI PENCIL COMPANY, LIMITED, Tokyo (JP)

(72) Inventors: Nao Kumai, Fujioka (JP); Yusuke Nakamura, Fujioka (JP); Kota Fujimoto, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/021,614

(22) PCT Filed: Aug. 19, 2021

(86) PCT No.: PCT/JP2021/030471
§ 371 (c)(1),
(2) Date: Feb. 16, 2023

(87) PCT Pub. No.: WO2022/039243
PCT Pub. Date: Feb. 24, 2022

(65) Prior Publication Data

US 2023/0292910 A1 Sep. 21, 2023

(30) Foreign Application Priority Data

Aug. 21, 2020 (JP) ................................ 2020-139994

(51) Int. Cl.
*A45D 34/04* (2006.01)
*B43K 5/18* (2006.01)
*B43K 8/06* (2006.01)

(52) U.S. Cl.
CPC ................ *A45D 34/04* (2013.01); *B43K 5/18* (2013.01); *B43K 8/06* (2013.01)

(58) Field of Classification Search
CPC ...... A45D 34/04; A45D 34/042; A45D 40/26; A45D 40/262; B43K 5/18; B43K 5/1809;
(Continued)

(56) References Cited

U.S. PATENT DOCUMENTS 4,289,248 A 9/1981 Lynn
4,494,665 A * 1/1985 Lehmann .......... B65D 41/0471 215/330
(Continued)

FOREIGN PATENT DOCUMENTS

JP 60-148461 A 8/1985
JP 2003-54181 A 2/2003
(Continued)

OTHER PUBLICATIONS

International Search Report for corresponding Application No. PCT/JP2021/030471, mailed Oct. 19, 2021.

*Primary Examiner* — David J Walczak
(74) *Attorney, Agent, or Firm* — Renner, Otto, Boisselle & Sklar, LLP

(57) ABSTRACT

A cosmetic liquid applicator that allows easy determination as to the completion state of replacement of an application liquid tank includes a front barrel to which an application liquid tank for storing a liquid cosmetic to be fed to an applying part is attached and a rear barrel attached to the front barrel to cover the application liquid tank. The front barrel has on its peripheral surface a male threaded portion and a first engagement portion formed in the circumferential direction and located in the rear of the male threaded portion while the rear barrel has on its inner circumferential surface a female threaded portion to mate with the male threaded portion and a second engagement portion to be engaged with the first engagement portion.

4 Claims, 9 Drawing Sheets

(58) Field of Classification Search
CPC . B43K 8/026; B43K 8/06; B43K 8/02; B43K 8/022; B43K 8/024
USPC .......................... 401/198, 199, 222–224, 269
See application file for complete search history.

(56) References Cited

U.S. PATENT DOCUMENTS

| | | | | |
|---|---|---|---|---|
| 4,597,501 | A | 7/1986 | Gueret | |
| 6,261,019 | B1 * | 7/2001 | Furukawa | B43K 7/02 401/223 |
| 6,276,861 | B1 * | 8/2001 | Tachikawa | B43K 5/18 401/231 |
| 11,589,665 | B2 | 2/2023 | Nakamura | |
| 2022/0061496 | A1 | 3/2022 | Nakamura | |

FOREIGN PATENT DOCUMENTS

| | | | |
|---|---|---|---|
| JP | 3133495 | U | 7/2007 |
| JP | 2011-135928 | A | 7/2011 |
| JP | 2015-165866 | A | 9/2015 |
| JP | 2018-192242 | A | 12/2018 |
| JP | 2020-1193 | A | 1/2020 |
| JP | 2020-23118 | A | 2/2020 |
| JP | 2020-116105 | A | 8/2020 |

* cited by examiner

APPLICATOR

TECHNICAL FIELD

This disclosure relates to an applicator for applying a coating liquid such as cosmetics.

BACKGROUND TECHNOLOGY

Conventionally, there have been applicators which include: a collector that is a comb-like feed member for temporarily storing a coating liquid to be supplied to the applying part, inside the front barrel from the front end of which the applying part is projected; and an application liquid tank that is installed from behind in the front barrel so that the coating liquid inside the application liquid tank can flow to the collector and the applying part.

In the applicators of this kind, as the structure that lets the outer barrel covering the application liquid tank fit to the front barrel from the rear of the front barrel, there is a configuration in which a projection for fixing the outer barrel is formed radially outwards at the rear end on the peripheral surface of the front barrel (e.g., see Patent Document 1).

PRIOR ART DOCUMENTS

Patent Document

Patent Document 1: Japanese Patent Application Laid-open No. 2018-192242

SUMMARY OF THE INVENTION

Problems to be Solved by the Invention

In the applicator of Patent Document 1, upon replacement of the application liquid tank, the outer barrel is fitted to the peripheral surface of the front barrel and fixed in such a manner that the projection on the front barrel is engaged with the inner circumferential surface of the outer barrel, so there is a problem that it is difficult to know whether the replacement is completed.

Under such circumstances, the present application is to provide a cosmetic liquid applicator which allows easy determination of the completion of replacement of the application liquid tank.

Means for Solving the Problem

The embodiment of the present disclosure is an applicator, comprising: a front barrel to which an application liquid tank for storing a liquid cosmetic to be fed to an applying part is attached; and a rear barrel attached to the front barrel to cover the application liquid tank, wherein: the front barrel has on the peripheral surface thereof a male threaded portion and a first engagement portion formed in the circumferential direction and located in the rear of the male threaded portion; and the rear barrel has on the inner circumferential surface thereof a female threaded portion to mate with the male threaded portion and a second engagement portion to be engaged with the first engagement portion.

In the embodiment of the present disclosure, it is preferable that a cap that can be attached to the front barrel to cover the applying part is provided, in which first protrusions are formed on the inner surface of the cap while second protrusions are formed on the peripheral surface of the front barrel so that when the cap is fitted to the front barrel, the first protrusion and the second protrusion can mesh with each other, and the second protrusions are formed on the endface of a flange on the peripheral side of the front barrel.

In the embodiment of the present disclosure, it is preferable that the cap has a concave formed on the peripheral surface thereof.

In the embodiment of the present disclosure, it is preferable that an inner front barrel is provided on the inner circumference of the front barrel, and on the inner circumferential surface of the inner front barrel is formed triangular apices.

Effect of the Invention

According to the applicator of the embodiment of the present disclosure, the front barrel has on the peripheral surface thereof a male threaded portion and a first engagement portion formed in the circumferential direction and located in the rear of the male threaded portion; and the rear barrel has on the inner circumferential surface thereof a female threaded portion to mate with the male threaded portion and a second engagement portion to be engaged with the first engagement portion. Therefore, when the female threaded portion of the rear barrel is screwed onto the male threaded portion of the front barrel, the first engagement portion and the second engagement portion are engaged with each other. As a result, the excellent effect is obtained that it is possible for a user to easily confirm that the rear barrel has been engaged with the front barrel from the feeling of the engagement.

MODE FOR CARRYING OUT THE INVENTION

Hereinafter, embodiments of the present disclosure will be described with reference to the accompanying drawings.

Figure 1:
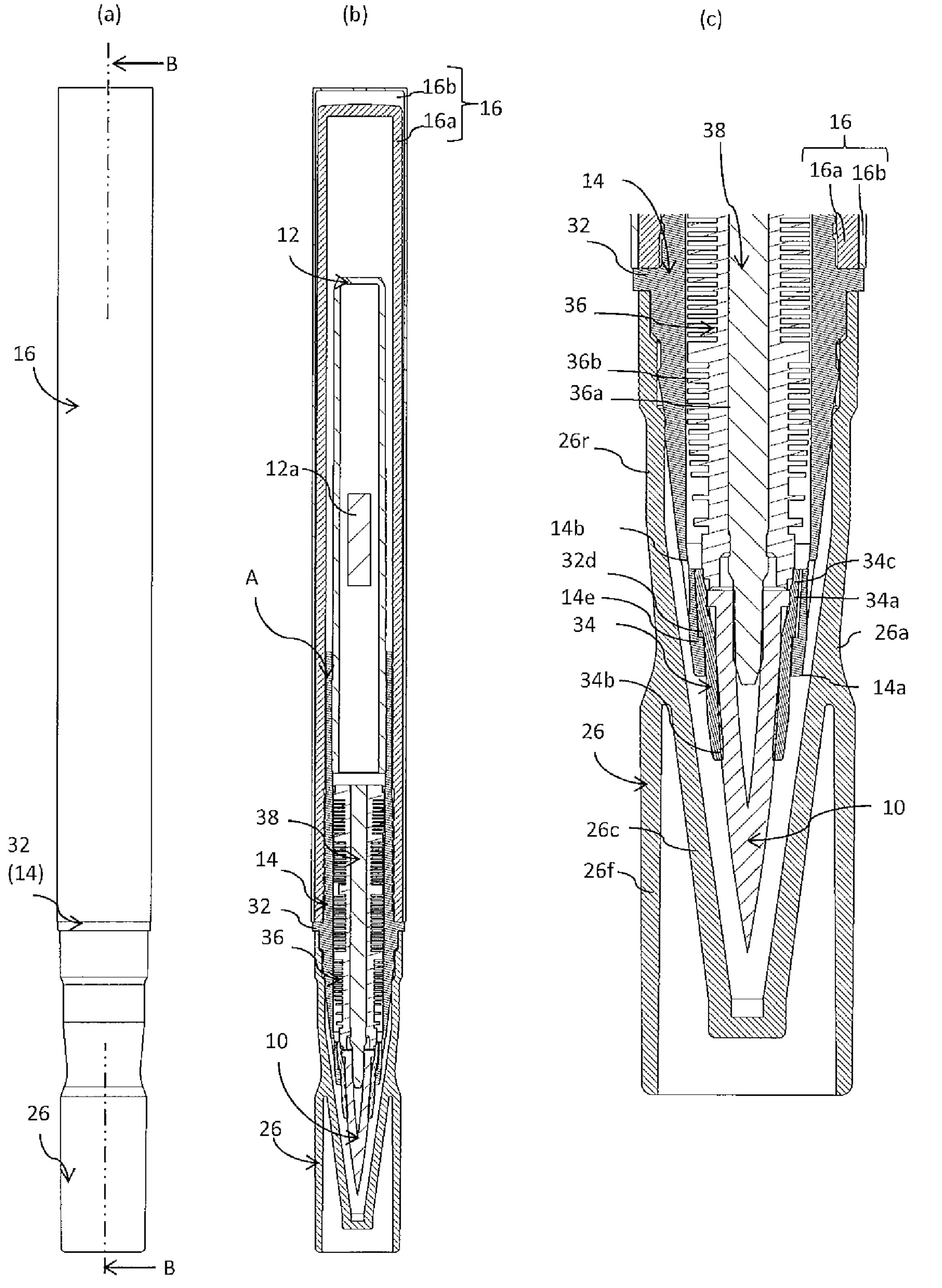
FIG. 1 An explanatory diagram of an applicator according to a first embodiment of the present disclosure, where (a) is an overall front view, (b) is a longitudinal sectional view taken along line B-B of (a), and (c) is an enlarged longitudinal sectional view of the front part.
Figure 2:
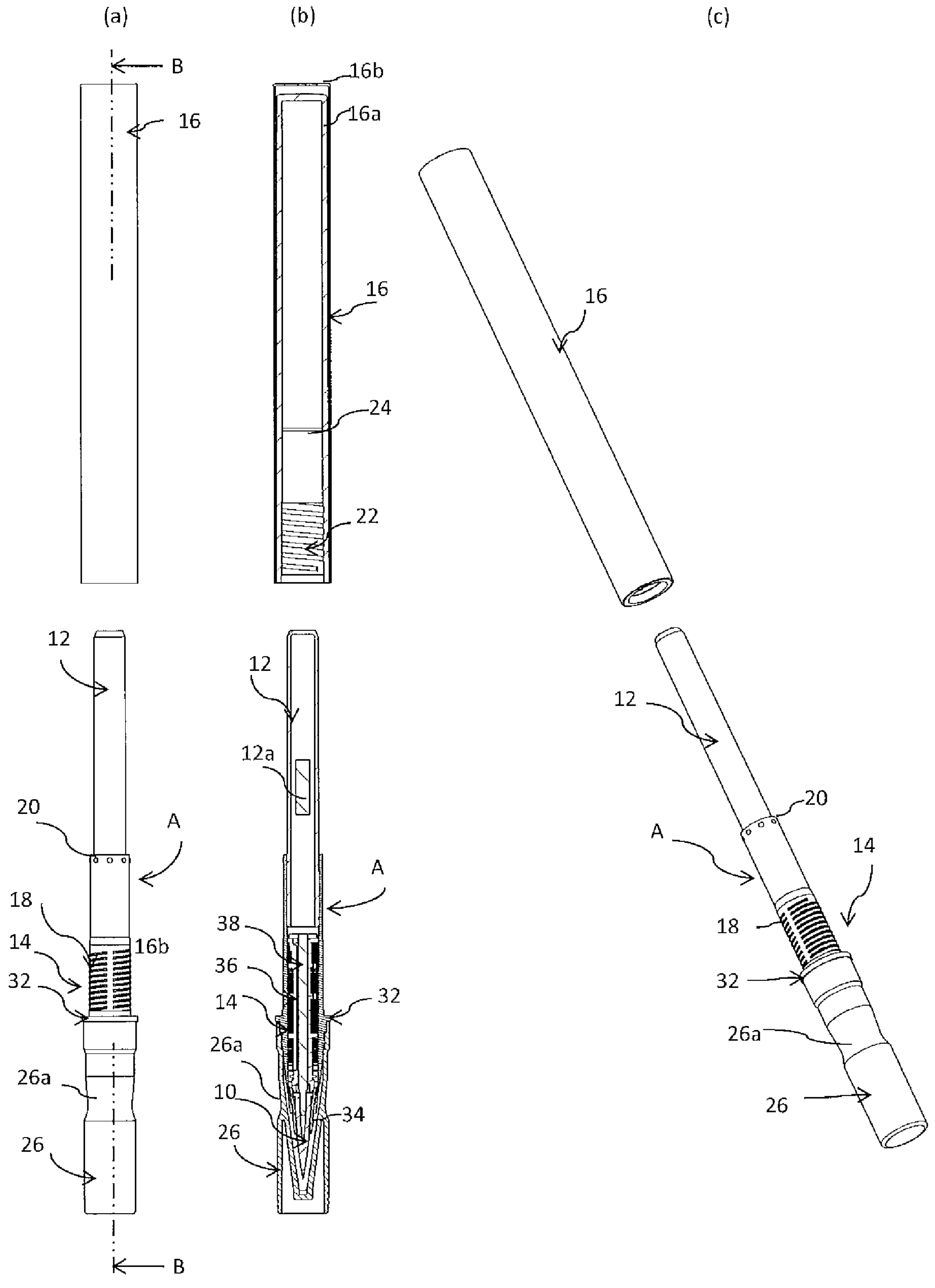
FIG. 2 An explanatory diagram of the applicator in FIG. 1 with the rear barrel detached from the front barrel, where (a) is an overall front view, (b) is a longitudinal sectional view along line B-B of (a), and (c) is a perspective view from the front.

FIG. 1 is an overall explanatory diagram showing an applicator according to a first embodiment. FIG. 2 is an explanatory diagram showing a state where a rear barrel is detached from a front barrel while it is refilled. FIGS. 3, 4, 5 and 6 are part diagrams showing the front barrel, a cap, the rear barrel, and an inner front barrel, respectively.

As shown in FIGS. 1 and 2, the applicator according to the first embodiment includes a front barrel 14 to which an application liquid tank 12 for storing a liquid cosmetic to be fed to an applying part 10 is attached, and a rear barrel 16 that is attached to the front barrel 14 from the rear to cover the application liquid tank 12. The front barrel 14 has on its peripheral surface a male threaded portion 18 and a first engagement portion 20 formed in the circumferential direction and in the rear of the male threaded portion 18 (see FIG. 3). The rear barrel 16 (main body **16*a*) has on its inner circumferential surface a female threaded portion 22 to mate with the male threaded portion 18 and a second engagement portion 24 to be engaged with the first engagement portion 20 (see FIG. 5**).

As shown in FIGS. 1 and 2, the applicator is formed with a refill A in which a cap 26, the applying part 10, the front barrel 14, the inner front barrel 34, a collector 36, and the application liquid tank 12 are assembled.

Figure 3:
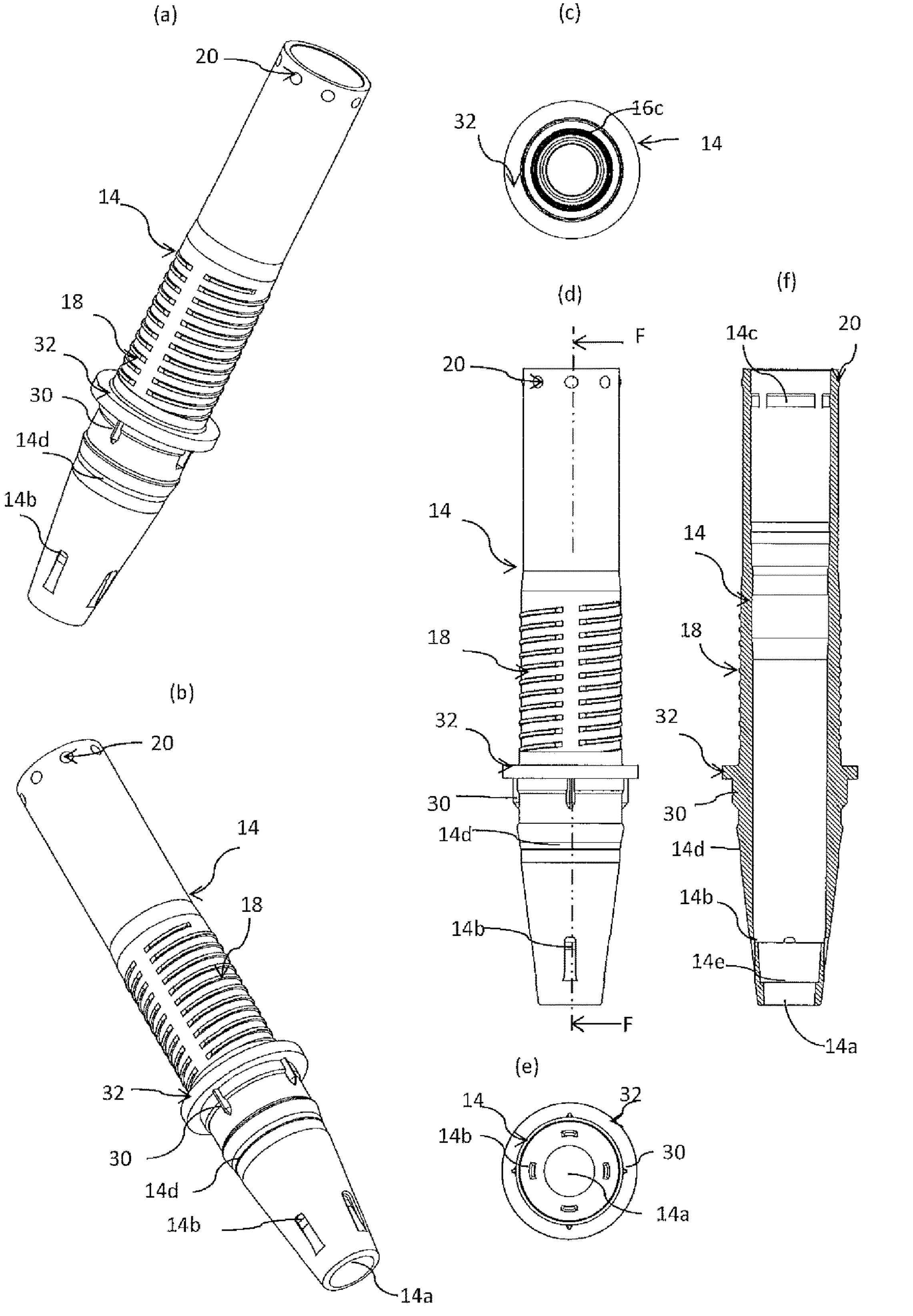
FIG. 3 A part diagram of the front barrel of the applicator of FIG. 1, where (a) is a perspective view from the rear, (b) is a perspective view from the front, and (c) is a view from the rear, (d) is a front view, (e) is a view from the front, and (f) is a vertical sectional view taken along line F-F of (d).
Figure 4:
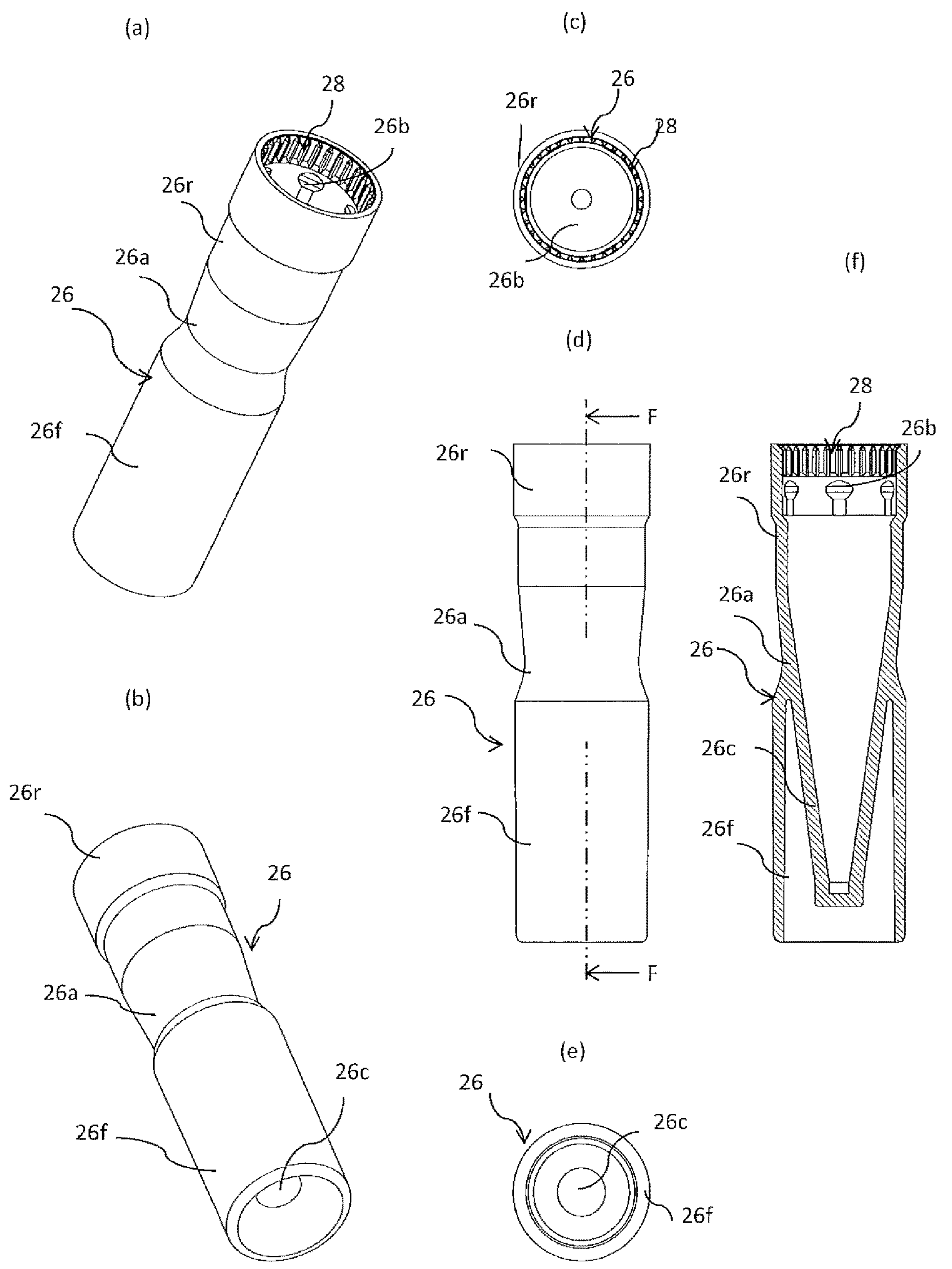
FIG. 4 A part diagram of a cap in the applicator of FIG. 1, where (a) is a perspective view from the rear, (b) is a perspective view from the front, (c) is a view from the rear, (d) is a front view, (e) is a view from the front, and (f) is a longitudinal sectional view taken along line F-F of (d).

As shown in FIGS. 3 and 4, the cap 26 that can be attached to the front barrel is provided to cover the applying part 10. First protrusions 28 are formed on the inner surface of the cap 26 while second protrusions 30 are formed on the peripheral surface of the front barrel 14 so that when the cap 26 is fitted to the front barrel 14 the first protrusion 28 and the second protrusion 30 can mesh with each other. The second protrusions 30 are formed on the endface of a flange 32 on the peripheral side of the front barrel 14.

In this applicator, the applying part 10 is mounted inside the front barrel 14 on the front-end side via the inner front barrel 34 while a liquid cosmetic is stored in the application liquid tank 12 attached to the rear end side of the front barrel 14.

The collector 36 is accommodated in the front barrel 14, and the application liquid tank 12 for storing a liquid cosmetic is mounted behind the collector 36. The flange 32 expands in diameter around the periphery of the front barrel 14, and shown in FIG. 1, the cap 26 abuts the front side of the flange 32 while the front end of the rear barrel 16 is placed against the rear side of the flange 32.

A relay core 38 is arranged through the axial center of the collector 36. The relay core 38 guides the liquid cosmetic material to the applying part 10.

In the applicator, the front end of the applying part 10 inside the front barrel 14 is projected and exposed from an opening **34*b* (see FIG. 6) of the inner front barrel 34 at the distal end of the front barrel 14. The inner circumferential surface of the opening 34*b* of the inner front barrel 34 is in contact with the periphery of the applying part 10**.

The applicator is configured so that inside the front barrel 14 the tip of the relay core 38 in the collector 36 is inserted into the rear end of the applying part 10 to guide the cosmetic material, and the collector 36 leads the liquid cosmetic material to the applying part 10 through a liquid cosmetic feed groove (slit). In the collector 36, the relay core 38 may be configured as a feeder formed with a liquid cosmetic feed groove made of fiber bundles or resin.

In the cosmetic applicator, as shown in FIG. 1, the rear end portion of the applying part 10 is hollow inside and formed with a flange having an enlarged diameter to the outside. The front end of the relay core 38 is inserted in the hollow interior.

Arranged inside the front barrel 14 is the collector 36, which has a function of temporarily retaining the liquid between multiple fins. The flange 32 is fixed in front barrel 14 by being pushed by the front end of collector 36. The relay core 38 in a hollow hole **36*a* of the collector 36 is configured to guide the liquid cosmetic from the application liquid tank 12 to the applying part 10**.

The application liquid tank 12 is fixed with its front end fitted in the rear portion of the front barrel 14.

[Collector 36]

As shown in FIG. 1, the hollow hole **36*a* is formed extending axially from the front end to the rear end inside the collector 36, and the relay core 38 is placed in the hollow hole 36*a*. A plurality of fins 36*b* are arranged at intervals on the periphery of the collector 36. They exert the function of the collector 36 so as to temporarily store the liquid therebetween by the capillary force. A slit (not shown) is formed in the longitudinal direction (axial direction) so as to cut through the fins 36*b*. The collector 36 allows the liquid cosmetic to flow in and out between the fins 36*b* through the slit. The hollow hole 36*a* may be formed with ribs so as to support the relay core 38** with the ribs.

The collector 36 is mounted inside the front barrel 14. At the rear end of the collector 36, the hollow hole **36*a* and the slit face the front opening of the application liquid tank 12**.

The rear endface (rear end) of the relay core 38 mounted in the hollow hole **36*a* of the collector 36 is exposed to the application liquid tank 12, and the relay core 38 feeds the liquid (liquid cosmetic) forward from the application liquid tank 12 (toward the applying part 10**).

Figure 6:
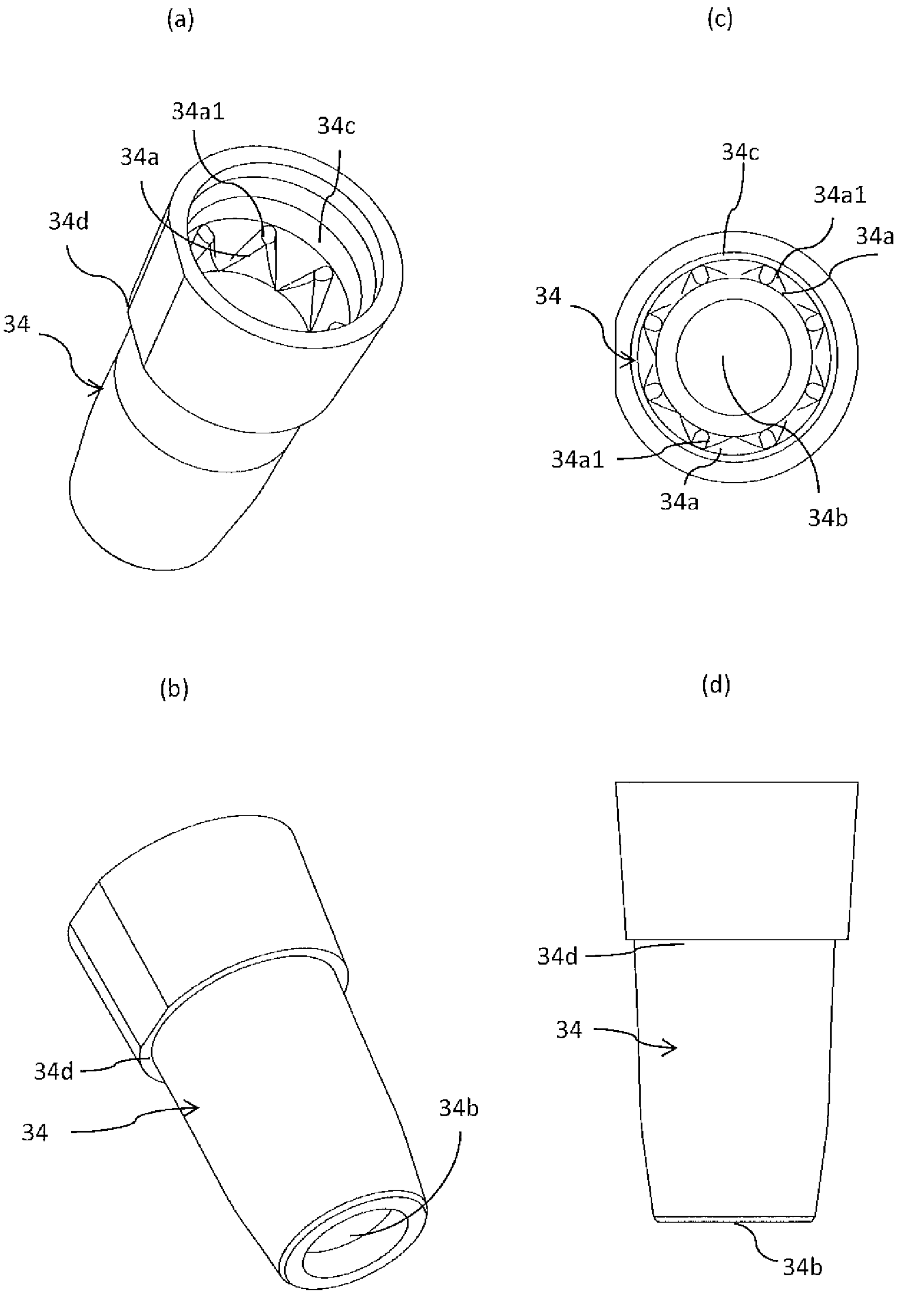
FIG. 6 A part diagram of an inner front barrel of the applicator of FIG. 1, where (a) is a perspective view from the rear, (b) is a perspective view from the front, (c) is a view from the rear, and (d) is a front view.

The front part of the collector 36 is formed like a cup, and the brim of the cup fits into the inner circumferential surface **34*c* inside the inner front barrel 34 and is positioned in contact with apexes 34*al* (see FIG. 6). The brim of the cup of the collector 36 presses the rear end of the applying part 10 (the rear endface of the flange). Also, the front end of the relay core 38 in the collector 36 is inserted into the rear end space of the applying part 10. The rear end of the collector 36 is exposed to the application liquid tank 12 so that the liquid cosmetic in the application liquid tank 12 flows through the slit and is stored between the fins 36*b* of the collector 36 when the internal pressure of the application liquid tank 12 rises for some reason such as a change in atmospheric pressure or temperature. The front barrel 14 is formed with a vent hole 14*b* for ventilating the inside and outside of the collector 36** for air-liquid replacement.

Outside air flows into the front barrel 14 through the vent hole **14*b*, so that the outside air circulates through the fins 36*b* and the slit around the collector 36 held in the front barrel 14. This ventilation inside the front barrel 14 alleviates the fluctuation of the internal pressure of the application liquid tank 12 if it occurs, to thereby prevent the liquid cosmetic from blowing out from the applying part 10** and the like and prevent the liquid cosmetic from being chocked to flow.

[Application liquid tank 12]

As shown in FIGS. 1 and 2, the front portion of the application liquid tank 12 is fitted into the rear portion of the front barrel 14 (in the rear of the flange 32), and the rear part of the collector 36 mounted inside the front barrel 14 is placed adjacent to the inside of the front portion of the application liquid tank 12. The application liquid tank 12 accommodates together with the liquid (coating liquid a metallic or resinous stirring piece 12*a* having a rod shape (or having an appropriate shape such as a sphere) for stirring the liquid.

[Front Barrel 14]

As shown in FIG. 3, the front barrel 14 has a roughly hollow cylindrical shape as a whole, with an opening 14*a* in the front-end part, behind which vent holes 14*b* for air ventilation penetrating through between the inner and outer circumferences are formed adjacently. Formed on the peripheral side of the rear portion of the front barrel 14 are the male threaded portion 18 and the first engagement portion 20 formed circumferentially behind the male threaded portion 18.

Specifically, the flange 32 is expanded in diameter around the middle part behind the vent holes 14*b* in the front-end part of the front barrel 14. The rear portion is extended cylindrically from the flange 32, and the male threaded portion 18 is formed on the peripheral side of the rear part from a point adjacent to the rear end surface of the flange 32 up to a point leaving about a half of the rear part. The male threaded portion 18 has a projected male thread with a break in the middle of the thread.

As shown in FIG. 3, near the rear end of the cylindrical rear part of the front barrel 14, the first engagement portion 20 is formed such that bumps are arrayed in the circumferential direction. Also arrayed circumferentially on the inner circumferential surface of the rear end of the front barrel 14 are internal bumps 14*c*, which are formed to hold the application liquid tank 12.

On the peripheral side of the front barrel 14 behind a circumferential projection 14*d*, and next and forward to the flange 32, the second protrusions 30, which are plate-like ribs tapered radially outwards and extended in the front-to-rear direction, are arrayed circumferentially. As shown in FIG. 4, the second protrusions 30 are configured to be engaged and mesh with the first protrusions 28 that are formed on the inner circumferential surface in the rear end of the cap 26, so that when the cap 26 is fitted to the front barrel 14, the relative rotation is restricted.

Additionally, a step 14*e* for engagement with the inner front barrel 34 is formed from the opening 14*a* to backward inside the front barrel 14. Formed between the vent holes 14*b* and the flange 32 of the front barrel 14 is the concave-convex circumferential projection 14*d*. As shown in FIG. 4, the first circumferential projection 14*d* is engaged with a locking projection 26*b* of the cap 26 so as to prevent the cap from coming off in the front-rear direction.

[Rear Barrel 16]

As shown in FIG. 2, the rear barrel 16 is constructed such that an outer cylinder 16*b* with a closed rear end having a design on the outer surface is fixed by fitting or bonding to the peripheral side of the cylindrical main body 16*a* with a closed end.

Figure 5:
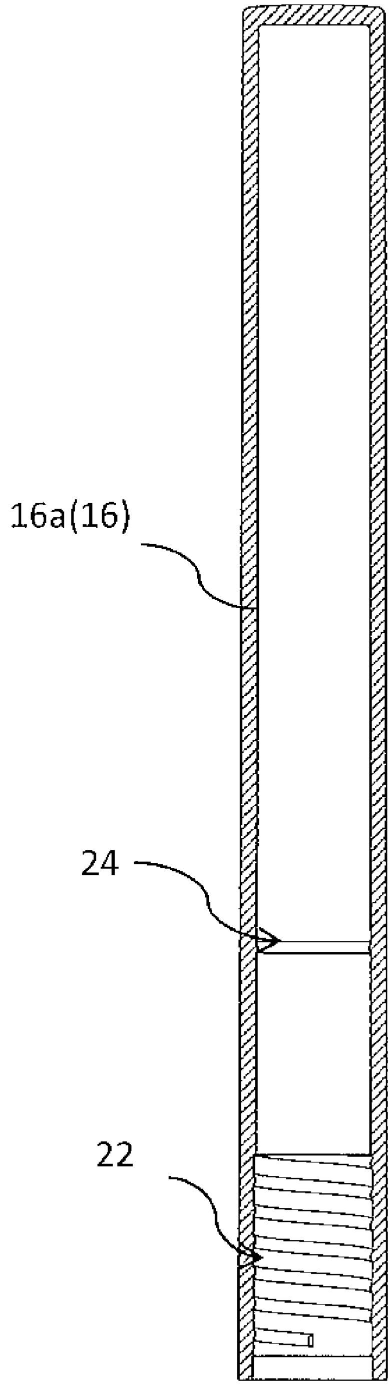
FIG. 5 A vertically sectioned part diagram of a rear barrel of the applicator of FIG. 1.

Detailedly, as shown in FIG. 5, the rear barrel 16 has the female threaded portion 22 formed on the inner circumference of the main body 16*a* of the rear barrel 16 in a form of an inward thread mating with the male threaded portion 18. Formed behind the female threaded portion 22 is the second engagement portion 24 for engaging with the first engagement portion 20 of the front barrel 14. The second engagement portion 24 is formed in an annular projection (annular rib) projected inward in a semicylindrical shape over the entire circumference of the inner circumferential surface of the main body 16*a* of the rear barrel 16. The second engagement portion 24 may have another form such as a concave-convex structure as long as it can be engaged with and fixed to the first engagement portion 20. Further, the rear barrel 16 has a substantially cylindrical shape with its rear end closed.

When the rear barrel 16 is mounted to the front barrel 14, as shown in FIG. 2, the front end of the rear barrel 16 is fitted on the peripheral side of the rear part of the front barrel 14 so as to cover the application liquid tank 12. Then, the rear barrel is turned clockwise so as to screw the female threaded portion 22 of the rear barrel 16 onto the male threaded portion 18 of the front barrel 14, whereby the first engagement portion 20 is made ride over the second engagement portion 24, establishing tight engagement and fixation as shown in FIG. 1. When the female threaded portion 22 of the rear barrel 16 is screwed onto the male threaded portion 18 of the front barrel 14, the engagement is established as the first engagement portion 20 rides over the second engagement portion 24. As a result, the user can easily confirm that the rear barrel 16 has been engaged with the front barrel 14 from the impact of the engagement.

[Cap 26]

As shown in FIG. 1, the cosmetic liquid applicator has the cap 26 that can be attached to the front barrel 14 to cover the applying part 10. First projections 28 are formed on the inner surface of the cap 26. As shown in FIG. 3, the second protrusions 30 are formed on the peripheral surface of the front barrel 14. When the cap 26 is mounted to the front barrel 14, the first protrusion 28 and the second protrusion 30 mesh with each other, and the second protrusions 30 are formed on the endface of the flange 32 on the periphery of the front barrel 14.

Specifically, as shown in FIG. 4, the cap 26 has first protrusions 28, made of multiple ribs each extended in the front-to-rear direction and arranged in the circumferential direction on the inner surface of the rear end part.

As shown in FIG. 3, the second protrusions 30 are formed on the front endface of the flange 32 projected radially outwards over the entire circumference of the front barrel 14. The second protrusion 30 is formed in the shape of a wall or a rib that is narrow and elongated in the axial direction.

Accordingly, the first protrusions 28 and the second protrusions 30 are configured to be able to mesh with each other when the cap 26 is mounted to the front barrel 14. As will be described later, when a refill A is replaced, by turning the rear barrel 16 while holding the cap 26, the front barrel 14 rotates together with the cap 26 without being slid, so that the attachment and detachment of the rear barrel 16 with respect to the front barrel 14 can be reliably performed.

Also, the cap 26 has a constriction 26*a* formed on the peripheral surface thereof. That is, as shown in FIGS. 1 and 4, the constriction 26*a* is formed such that the middle part of the peripheral side with respect to the front-rear direction is constricted to be smaller in diameter than the front and rear portions 26*f* and 26*r*. The whole of the cap 26 roughly assumes a hourglass-like shape. Since the cap 26 is formed with the constriction 26*a*, the effect is provided that the user can easily hold the constriction 26*a* of the cap 26 with fingers and easily attach and detach the cap 26.

A conical inner sleeve 26*c* which is tapered and closed at distal end, is extended continuously from the rear portion 26*r* while the front portion 26*f* having a cylindrical shape is integrally formed outside the inner sleeve 26*c*.

The cap 26 has a plurality of locking projections 26*b* for fixing that are arranged on its inner circumference adjacent to and in front of the first protrusions 28 so as to be engaged with the circumferential projection 14*d* of the front barrel 14. Therefore, when the locking projections 26*b* lock the circumferential projection 14*d*, the cap 26 becomes unlikely to come off from the front barrel 14, and the first protrusions 28 and the second protrusions 30 can be kept in mesh with each other, so that the rear barrel 16 can be reliably attached to and detached from the refill A.

In addition, the cap 26 may be used as a temporary cap when the product is traded as a refill A, and after replacement of the refill A being attached to the rear barrel 16, the cap 26 may be replaced with the original decorative cap with a design provided on the peripheral side.

[Inner Front Barrel 34]

As shown in FIG. 1, the inner front barrel 34 is arranged on the interior circumference of the front barrel 14 with its tip projected from the opening 14*a* of the front barrel 14.

Detailedly, as shown in FIG. 6 the inner front barrel 34 has a tubular, roughly conical shape having an opening 34*b* at the tip and has ribs 34*a* of a triangular shape oriented rearwards and having a projected apex 34*al*, formed on the inner circumferential surface in the rear part thereof.

Formed from the rear end to the interior of the inner front barrel 34 is a flat inner circumferential surface 34*c* having a slightly tapered shape. The apexes 34*al* are projected radially inward in a stepped manner, from the inner circumferential surface 34*c*.

In addition, an engaging step 34*d* for mating with the step (step 14*e* adjacent to the opening 14*a* (see FIG. 3)) inside the front barrel 14 is formed on the peripheral side of the inner front barrel 34 near the middle part with respect to the axial direction.

Since the inner front barrel 34 has ribs 34*a* having apexes 34*al* therein, the applying part 10 can be combed or guided by the apexes 34*al* of the ribs 34*a* when the applying part 10 is assembled, thus the fiber of the applying part 10 can be guided into the inner front barrel 34 without being disordered so that the applying part 10 can be attached neatly without re-assembling.

Alternatively, the inner front barrel 34 may be formed integrally with the front barrel 14 by two-color molding or the like. It is preferable to use different colors to distinguish the inner front barrel 34 from the front barrel 14.

[Liquid Cosmetic]

The liquid cosmetic stored in the application liquid tank 12 preferably contains water, a water-soluble organic solvent, a film-forming agent, a coloring material, and an antiseptic as essential components.

More specifically, the coloring material can use at least one of titanium oxide, iron oxide, Prussian blue, and ultramarine. Titanium oxide preferably has a specific weight of 3.8 to 4.2 with a particle size of 200 to 500 nm in the cosmetic. Iron oxide preferably has a specific weight of 3.8 to 5.5 with a particle size of 90 to 600 nm in the cosmetic. Prussian blue preferably has a specific weight of 1.8 to 1.9 with a particle size of 80 to 300 nm in the cosmetic. Ultramarine preferably has a specific weight of 1.8 to 1.9 with a particle size of 300 to 600 nm in the cosmetic. Here, in the present invention, “particle size” is a value obtained by measuring the liquid cosmetic (25° C.) with a particle size analyzer F PAR-1000 (manufactured by Otsuka Electronics Co., Ltd.) using a dynamic light scattering method.

Other coloring materials that can be used include: for example, organic pigments such as Blue No. 1 Al lake, Red No. 202, Red No. 220, Red No. 226, Red No. 228, Blue No. 201, Blue No. 204, Blue No. 404, Yellow No. 401, Yellow No. 205, Yellow No. 4 Al lake, Yellow No. 203 Al lake, Red No. 104 Al lake, carbon black, carmine; acid dyes such as Red No. 2, Red No. 3 (FD&C Red No. 3), Red No. 40 (FD&C Red No. 40), Red No. 102, Red No. 104 (D&C Red No. 28), Red No. 105, Red No. 106, Red No. 201 (D&C Red No. 6), Red No. 202 (D&C Red No. 7), Red No. 203, Red No. 205, Red No. 227 (D&C Red No. 33), Red No. 230-1 (D&C Red No. 22), Red No. 401 Red No. 402, Red No. 504 (FD&C Red No. 4), Orange No. 205 (D&C Orange No. 4), Orange No. 402, Yellow No. 4 (FD&C Yellow No. 5), Yellow No. 5 (FD&C Yellow No. 6), Yellow No. 203 (D&C Yellow No. 10), Yellow No. 402, Yellow No. 403-1 (Ext. D&C Yellow No. 7), Yellow No. 406, Yellow No. 407, Green No. 3 (FD&C Green No. 3), Green No. 201, Green No. 402, Blue No. 1 (FD&C Blue No. 1), Blue No. 2 (FD&C Blue No. 2), Blue No. 203, Blue No. 205 (D&C Blue No. 4), Blue No. 403, Blue No. 404, Brown No. 201 (D&C Brown No. 1), Violet No. 401 (Ext. D&C Violet No. 2), Black No. 401; inorganic pigments already mentioned such as titanium oxide, iron oxide, Prussian blue, and ultramarine. At least one coloring material can be selected from the above and the coloring material is not particularly limited as long as it is used in aqueous cosmetics.

The content of these coloring materials is preferably 0.05 to 30% of the total amount of the liquid cosmetic, more preferably 0.1 to 20% in terms of color development, suitable viscosity, and smooth discharge from a water-based cosmetic applicator equipped with an applicator.

The water-soluble organic solvent that can be used is not particularly limited and any can be used as long as it is commonly used in cosmetics. Examples include ethanol, isopropanol, phenoxyethanol and the like.

The content of the water-soluble organic solvent is preferably 0 to 20%, more preferably 8 to 15%, relative to the total amount of the liquid cosmetic.

Examples of the film-forming agent that can be used include emulsion resins of copolymers of one or more monomers selected from acrylic acid, methacrylic acid, their alkyl esters or derivatives, styrene, and vinyl acetate.

The content of the film-forming agent (emulsion resin) is preferably 2 to 15%, more preferably 2 to 10%, relative to the total amount of the liquid cosmetic in terms of solid content (resin content).

The liquid cosmetic to be used contains water (inclusive of purified water, distilled water, ion-exchanged water, pure water, ultrapure water, etc.) as the solvent. The content of the water is the remainder of the above components and the aftermentioned optional components.

Furthermore, the liquid cosmetic to be used can contain, in addition to the above components, optional ingredients used in ordinary liquid cosmetics. Specifically, preservatives, antioxidants, neutralizers, ultraviolet absorbers, chelating agents, moisturizing agents, beauty ingredients, fragrances, viscosity modifiers, etc. can be contained in appropriate amounts within a range that does not impair the effects of the present invention.

In order to smoothly discharge the coating liquid from the applicator and in order to exhibit good application performance, the liquid cosmetic to be used preferably has a viscosity of 2 to 9 mPa-s measured by an ELD type viscometer at a temperature of 25° C. and a shear rate of 76.6$S^{-1}$ and a surface tension of 34 mN/m or higher. Here, the surface tension is the measurement obtained at a temperature of 25° C. using a CBVP-Z type surface tensiometer (plate method) manufactured by Kyowa Interface Science Co., Ltd.

[Refill A]

Here, as shown in FIG. 2 the refill A is configured as an assembly of the cap 26, the applying part 10, the front barrel 14, the inner front barrel 34, the collector 36, the relay core 38 and the application liquid tank 12. The assembly can be put on the market as the refill A for replacement.

According to the cosmetic liquid applicator according to the first embodiment, as shown in FIG. 2, the front barrel 14 has on its peripheral surface the male threaded portion 18 and the first engagement portion 20 formed in the circumferential direction in the rear of the male threaded portion 18, while the rear barrel 16 has on its inner circumferential surface the female threaded portion 22 to mate with the male threaded portion 18 and the second engagement portion 24 to be engaged with the first engagement portion 20. Accordingly, when the female threaded portion 22 of the rear barrel 16 is screwed onto the male threaded portion 18 of the front barrel 14, the engagement is established as the first engagement portion 20 rides over the second engagement portion 24, so that can be provided an excellent effect that the user can easily confirm the engagement between the rear barrel 16 the front barrel 14 from the touch of the engagement.

Further, as shown in FIG. 2 the refill A is configured as an assembly of the applying part 10, the front barrel 14, the inner front barrel 34, the collector 36, the relay core 38 and the application liquid tank 12, so that the assembly can be put on the market as the refill A for replacement. Since the first protrusions 28 are engaged with the second protrusions 30 (see FIGS. 3 and 4), the relative rotation of the cap 26 to the front barrel 14 is restricted. When the rear barrel 16 is screwed in by holding the cap 26, the rear barrel 16 can be screwed completely into the front barrel 14 until the first engagement portion 20 becomes tightly engaged with the second engagement portion 24, thus making it possible to achieve correct attachment without fail.

Next, an applicator according to a second embodiment will be described.

Figure 7:
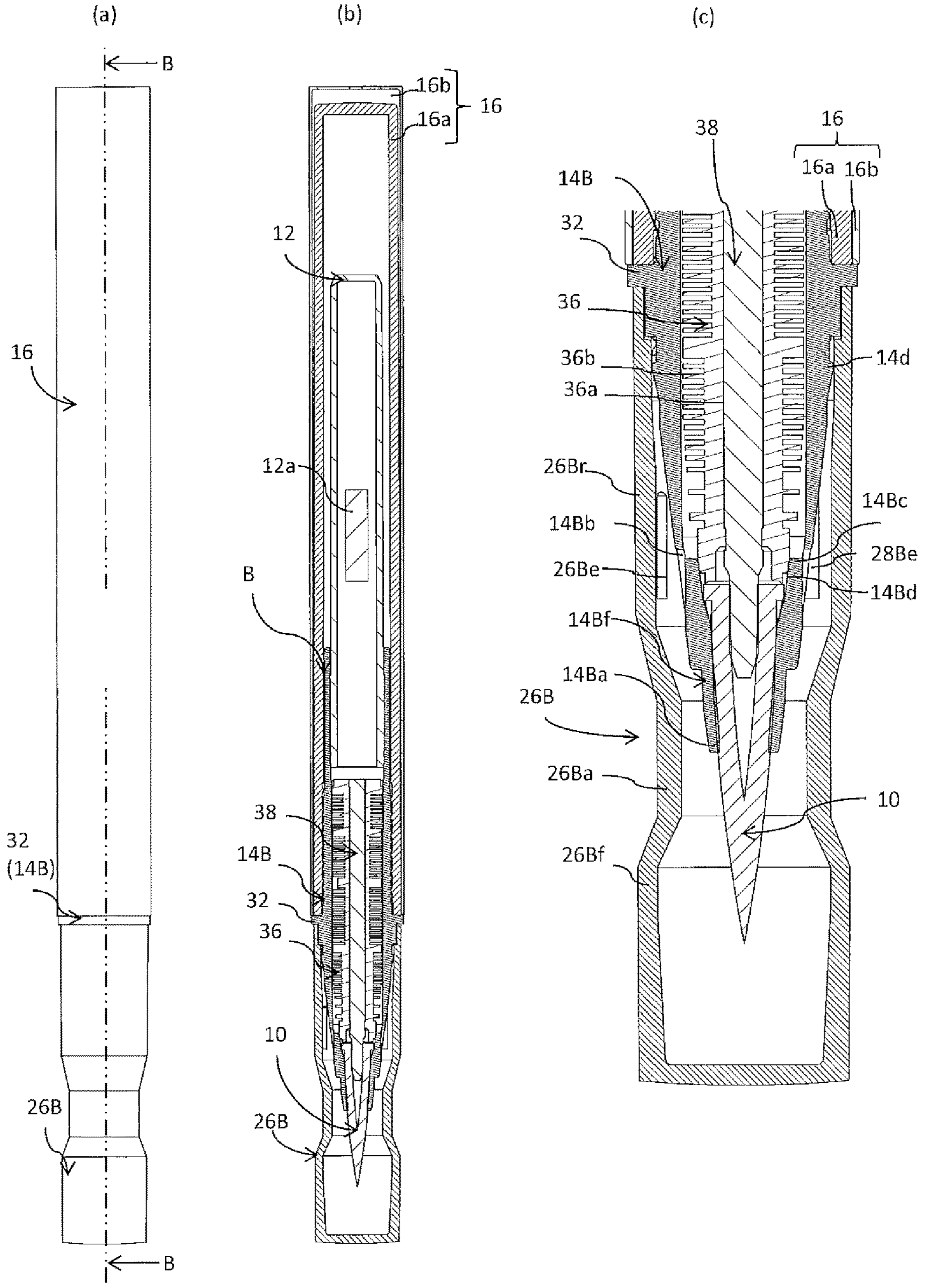
FIG. 7 An explanatory diagram of an applicator according to the second embodiment of the present disclosure, where (a) is an overall front view, (b) is a vertical sectional view along line B-B of (a), and (c) is an enlarged longitudinal sectional view of the front part.
Figure 8:
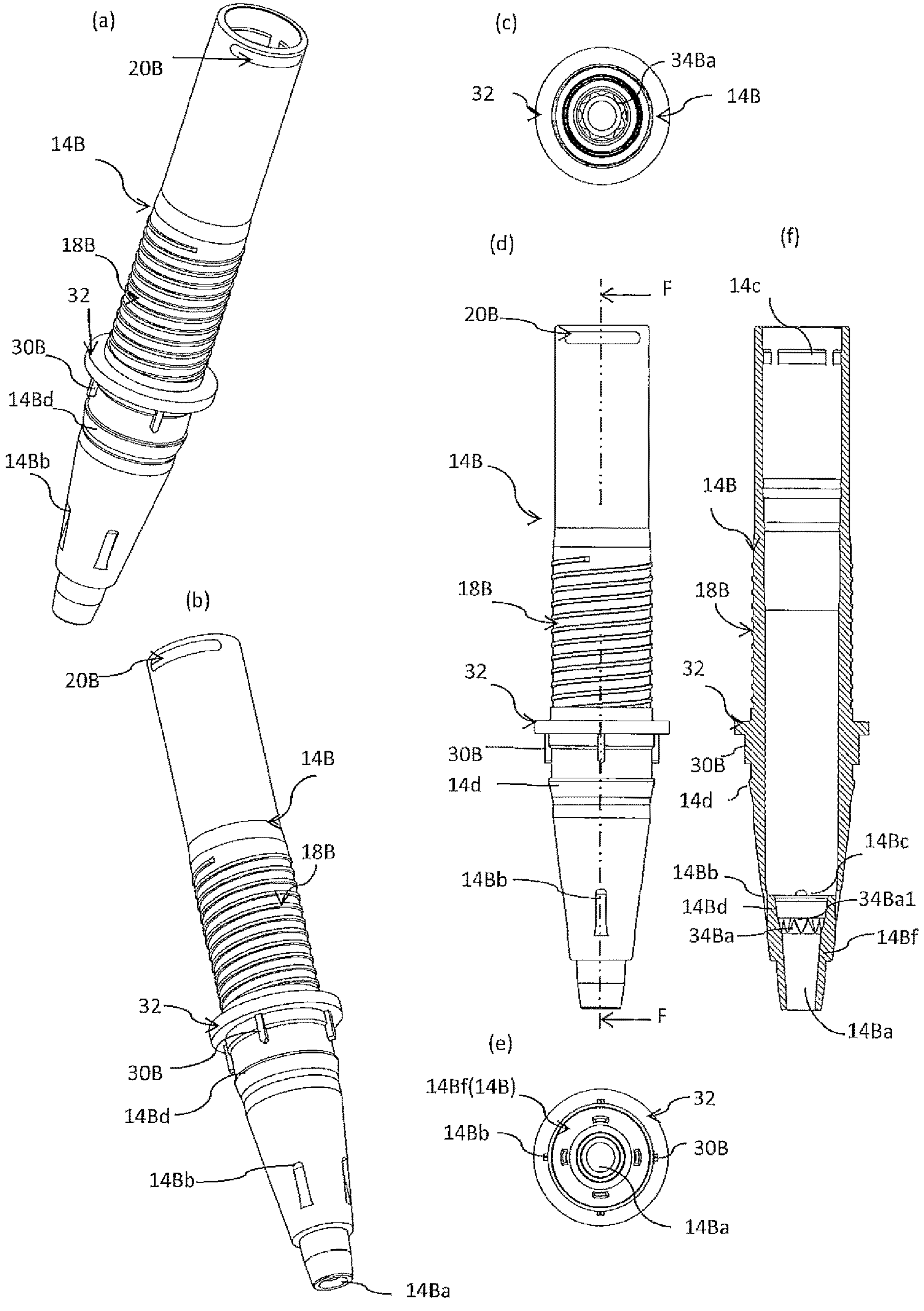
FIG. 8 A part diagram of a front barrel in the applicator of FIG. 7, where (a) is a perspective view from the rear, (b) is a perspective view from the front, (c) is a view from the rear, (d) is a front view, (e) is a view from the front, and (f) is a longitudinal sectional view taken along line F-F of (d).
Figure 9:
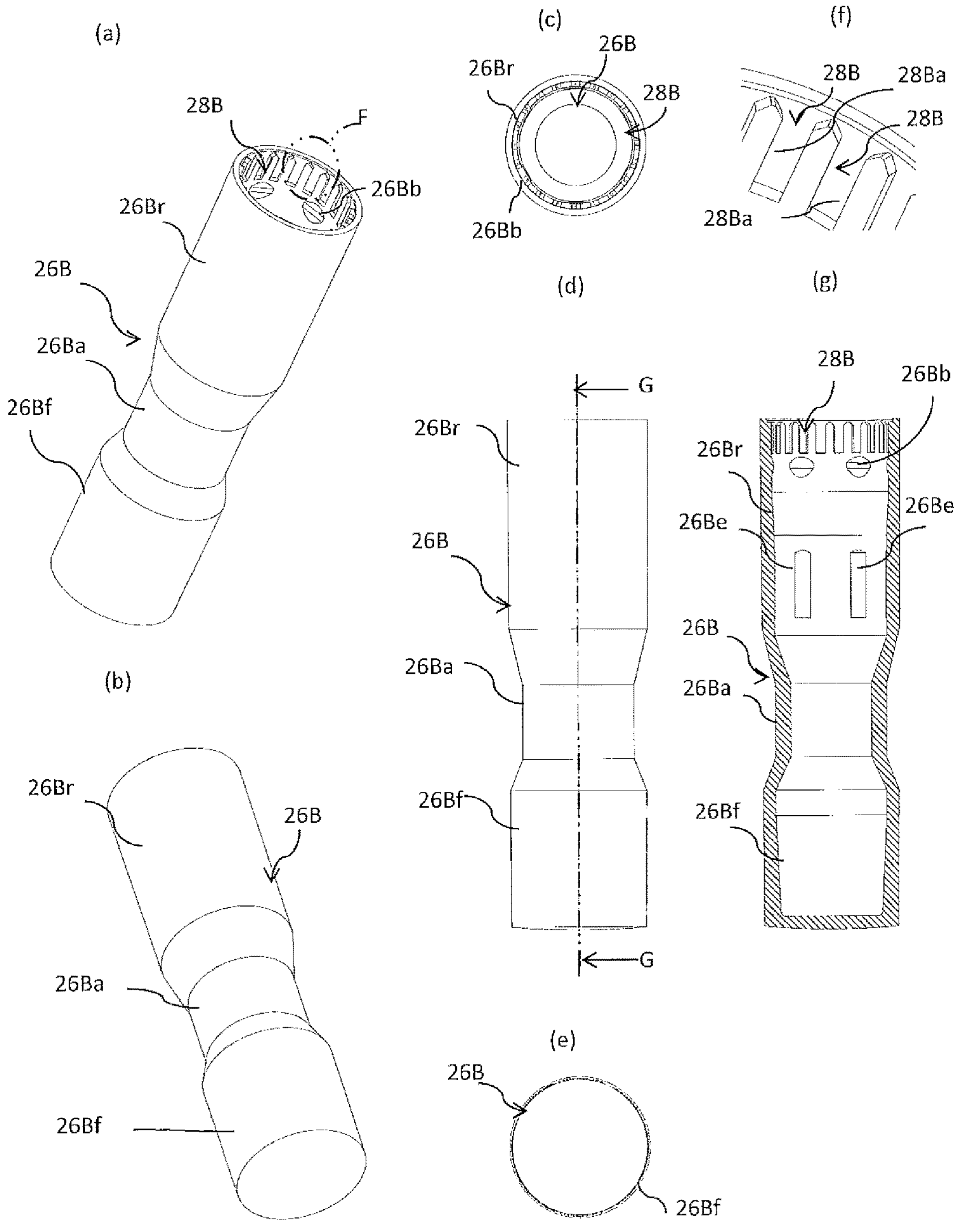
FIG. 9 A part diagram of a cap in the applicator of FIG. 7, where (a) is a perspective view from the rear, (b) is a perspective view from the front, (c) is a view from the rear, (d) is a front view, (e) is a view from the front, (f) is a detailed view of part F of (a), and (g) is a longitudinal sectional view taken along line G-G of (d).

FIG. 7 is an overall explanatory diagram showing an applicator according to the second embodiment. FIG. 8 is a part drawing of a front barrel 14B. FIG. 9 is a part drawing of a cap 26B. In these figures of the applicator according to the second embodiment, the same reference numerals are allotted to the same parts as in the first embodiment.

As shown in FIG. 7, the applicator is formed with a refill B in which a cap 26B, an applying part 10, a front barrel 14B, a collector 36, and an application liquid tank 12 are assembled. This applicator is different from the first embodiment in the overall configuration of the cap 26B and the partial configuration of the front barrel 14B, while is otherwise the same.

As shown in FIGS. 7 to 9, the cap 26B that can be mounted to the front barrel 14B is provided to cover the applying part 10. First protrusions 28B are formed on the inner surface in the rear end part of the cap 26B (on the side into which the front barrel 14B is fitted) while second protrusions 30B are formed on the peripheral surface of the front barrel 14B so that the first protrusion 28B and the second protrusion 30B can engage with each other for anti-falling when the cap 26B is fitted to the front barrel 14B. The second protrusions 30B are formed and extended from the front endface of a flange 32 on the peripheral side of the front barrel 14B.

[Front Barrel 14B]

As shown in FIG. 8, the front barrel 14B is integrally formed up to front-end part and has a structure similar to that of a separated inner front barrel 34 of the first embodiment at a front-end portion 14Bf of the front barrel 14B. Further, the first engagement portion 20B is formed to be a rib elongated in the circumferential direction.

The front barrel 14B has a generally hollow cylindrical shape as a whole, and the front-end portion 14Bf has a tapered peripheral surface extending rearwards from the opening 14Ba at the tip, having vent holes 14Bb for air ventilation that come through a gap between the inner and outer circumferences.

The front-end portion 14Bf has a hollow tapered configuration in which the same structure as the inner front barrel 34 of the first embodiment is integrated with the front barrel 14B. A stepped portion 14Bc is formed inside the position where the vent holes 14Bb are, and the inner circumference of the stepped portion form a tapered bore that extends to the opening 14Ba. Formed on the inner circumferential surface of the front-end portion 14Bf, located in front of the stepped portion 14Bc, is a tapered positioning portion 14Bd that receives and positions the cup-shaped distal end portion of the collector 36 together with the applying part 10 therein. Further, a rib 34Ba having triangular apexes 34Ba1 projected rearwards is formed on the inner circumferential surface in front of the positioning portion 14Bd.

Formed on the peripheral side behind the flange 32 in the front barrel 14B is a male threaded portion 18B and a first engagement portion 20B that is located behind the male threaded portion 18B and elongated along the circumferential direction. The male threaded portion 18B is a convex male thread with no break in the middle of the thread.

In addition, behind a circumferential projection 14*d* of the front barrel 14B and in front of the peripheral side adjacent to the flange 32, a plurality of second protrusions 30B, which are formed to be plate-like ribs extended in the front-to-rear direction and have a flat radially outside face, are arrayed circumferentially.

[Cap 26B]

As shown in FIGS. 7 to 9, the applicator has the cap 26B that can be attached to the front barrel 14B to cover the applying part 10. First projections 28B are formed on the inner surface of the cap 26B. the second protrusions 30B are formed on the peripheral surface of the front barrel 14B. When the cap 26B is attached to the front barrel 14B, the first protrusion 28B and the second protrusion 30B mesh with each other, and the second protrusion 30B is formed on the endface of the flange 32 on the periphery of the front barrel 14B.

Specifically, as shown in FIG. 9, the cap 26B has first protrusions 28B of multiple ribs each extended in the front-to-rear direction and arranged in the circumferential direction on the inner surface of the rear end part. As shown in FIG. 9(*f*), the first protrusion 28B has an inner circumferential end 28Ba formed in a flat hill shape.

Therefore, when the cap 26B is attached to the front barrel 14B, the first protrusion 28B and the second protrusion 30B are configured to mesh with each other.

The second protrusion 30 of the front barrel 14B is engaged and meshes with the first protrusion 28B formed on the inner circumferential surface of the rear end of the cap 26B. In the state where the cap 26B is fitted to the front barrel 14B, relative rotation is restricted.

In addition, the inner circumferential end 28Ba of the first protrusion 28B is flat, and the second protrusion 30B of the front barrel 14B has a flat radially outward end.

Therefore, since the opposing distal ends of the first protrusion 28B and the second protrusion 30B are flat, the first protrusion 28B and the second protrusions 30B can easily ride over each other when the cap 26B is attached to the front barrel 14B. After riding over one another, the second protrusion 30B and the first protrusions 28B are rotated, the relative rotation therebetween is restricted. In addition, because of the easiness to ride over, the applied force can be dispersed, so that it is possible to reliably prevent breakage of one or both of the first protrusion 28B and the second protrusion 30B due to abutment.

Here, similarly to the refill A, in replacing refills B, when the rear barrel 16 is turned by holding the cap 26B, the front barrel 14 rotates together with the cap 26B without being slid, so that the attachment and detachment of the rear barrel 16 with respect to the front barrel 14B can be reliably performed.

Also, the cap 26B has a constriction 26Ba formed on the peripheral surface thereof. That is, as shown in FIG. 9, the constriction 26*a* is formed such that the middle part of the peripheral side with respect to the front-rear direction is constricted to be smaller in diameter than the front and portions 26Bf and 26Br. That is, the whole of the cap 26B roughly assumes a hourglass-like shape. Since, similar to the first embodiment, the cap 26B is formed with the constriction 26Ba, the user can easily hold the constriction 26*a* of the cap 26B with their fingers to easily attach and detach the cap 26B.

Further, since the front-end portion 26Bf is closed with a flat end, the cap 26B has an approximately hourglass shape as a whole, so that no inner sleeve 26*c* as in the first embodiment is provided, which simplifies the shape of the cap.

In addition, on the inner circumferential side of the cap 26B, a plurality of locking projections 26Bb for fixing that are arrayed circumferentially adjacent to the first protrusions 28B and engaged with the circumferential projection 14*d* of the front barrel 14B. As shown in FIG. 9, axially elongated ribs 26Be are standing on the inner circumferential side in front of the locking projections 26Bb. Thus, as shown in FIG. 7, the front barrel 14B is supported from the periphery when the cap 26B is fitted to the front barrel, whereby the cap 26B can be prevented from rattling.

The above-described embodiment is an example of the present invention, and it goes without saying that modifications within the scope of the present invention should also be included within the technical scope.

INDUSTRIAL APPLICABILITY

The applicator of the present invention can be used as an applicator for a coating liquid.

DESCRIPTION OF SYMBOLS

10 applicator
12 application liquid tank
14 front barrel
14*c* internal bump
14*d* circumferential projection
14*e* step
14B front barrel
14Bf front-end portion
16 rear barrel
16*a* main body
16*b* outer cylinder
18 male threaded portion
18B male thread portion
20 first engagement portion
20B first engagement portion
22 female threaded portion
24 second engagement portion
26 cap
26*a* constriction
26*b* locking projection
26*c* inner sleeve
26*f* front portion
26*r* rear portion
26B cap
26Ba constriction
26Bb locking projection
26Be rib
26Bf front-end portion
28 first protrusion
28B first protrusion
30 second protrusion
30B second protrusion
32 flange
34 inner front barrel
34*a* rib
34*al* apex
34*b* opening
34*c* inner circumferential surface
34*d* engaging step
34Ba rib
34Ba1 apex
36 collector
38 relay core
A refill
B refill

The invention claimed is:

1. An applicator, comprising:

a front barrel to which an application liquid tank for storing a liquid cosmetic to be fed to an applying part is attached; and a rear barrel attached to the front barrel to cover the application liquid tank, wherein:

the front barrel has on a peripheral surface thereof a male threaded portion and a first engagement portion formed in a circumferential direction and located in a rear of the male threaded portion;

the rear barrel has on an inner circumferential surface thereof a female threaded portion to mate with the male threaded portion and a second engagement portion to be engaged with the first engagement portion; and wherein the first engagement portion includes bumps, and the second engagement portion includes an annular projection projected inward in a semicylindrical shape over the entire circumference of the inner circumferential surface of a main body of the rear barrel.

2. The applicator according to claim 1, further comprising a cap that can be attached to the front barrel to cover the applying part, wherein first protrusions are formed on an inner surface of the cap and second protrusions are formed on the peripheral surface of the front barrel, so that when the cap is fitted to the front barrel, the first protrusion and the second protrusion mesh with each other, and the second protrusions are formed on an end face of a flange on a peripheral side of the front barrel.

3. The applicator according to claim 2, wherein the cap has a constriction formed on a peripheral surface thereof.

4. The applicator according to any claim 1, wherein an inner front barrel is provided on an inner circumference of the front barrel, and the inner circumferential surface of an inner front barrel is formed with triangular apexes.

* * * * *